United States Patent [19]

Bourke

[11] 4,063,982

[45] Dec. 20, 1977

[54] METHOD OF MAKING A COMPOSITE SURFACE ELEMENTS OF STONE AND LIGHTWEIGHT SHEET MATERIAL

[76] Inventor: Patrick Terence Bourke, Doon House, Maam, County Galway, Ireland

[21] Appl. No.: 686,213

[22] Filed: May 12, 1976

Related U.S. Application Data

[63] Continuation-in-part of Ser. No. 394,138, Sept. 4, 1973, Pat. No. 3,963,846.

[30] Foreign Application Priority Data

Sept. 4, 1972 United Kingdom ............... 40839/72
Jan. 19, 1973 United Kingdom ................. 2795/73

[51] Int. Cl.² ............................................. B32B 31/00
[52] U.S. Cl. .................................................. 156/254
[58] Field of Search ................ 156/254, 250; 428/446, 428/452, 116, 73

[56] References Cited

U.S. PATENT DOCUMENTS

| | | | |
|---|---|---|---|
| 602,159 | 4/1898 | Harrison et al. ..................... | 156/254 |
| 2,313,892 | 3/1943 | Russell .................................. | 156/250 |
| 2,998,342 | 8/1961 | Waugh et al. ........................ | 156/254 |
| 3,723,233 | 3/1973 | Bourke ................................. | 156/254 |
| 3,950,202 | 4/1976 | Hodges ................................. | 156/154 |

*Primary Examiner*—Douglas J. Drummond
*Attorney, Agent, or Firm*—Young & Thompson

[57] ABSTRACT

The invention relates to a method of manufacturing surface elements such as tiles or panels consisting of a thin lamina of natural stone bonded to a backing consisting of a multicellular paper core material of substantially greater thickness than the lamina which at least on the side remote from the stone lamina has a skin of tenacious sheet material bonded thereto. The method comprises bonding the backing to a stone slab and thereafter severing from the slab a thin lamina of stone with the backing attached.

1 Claim, 8 Drawing Figures

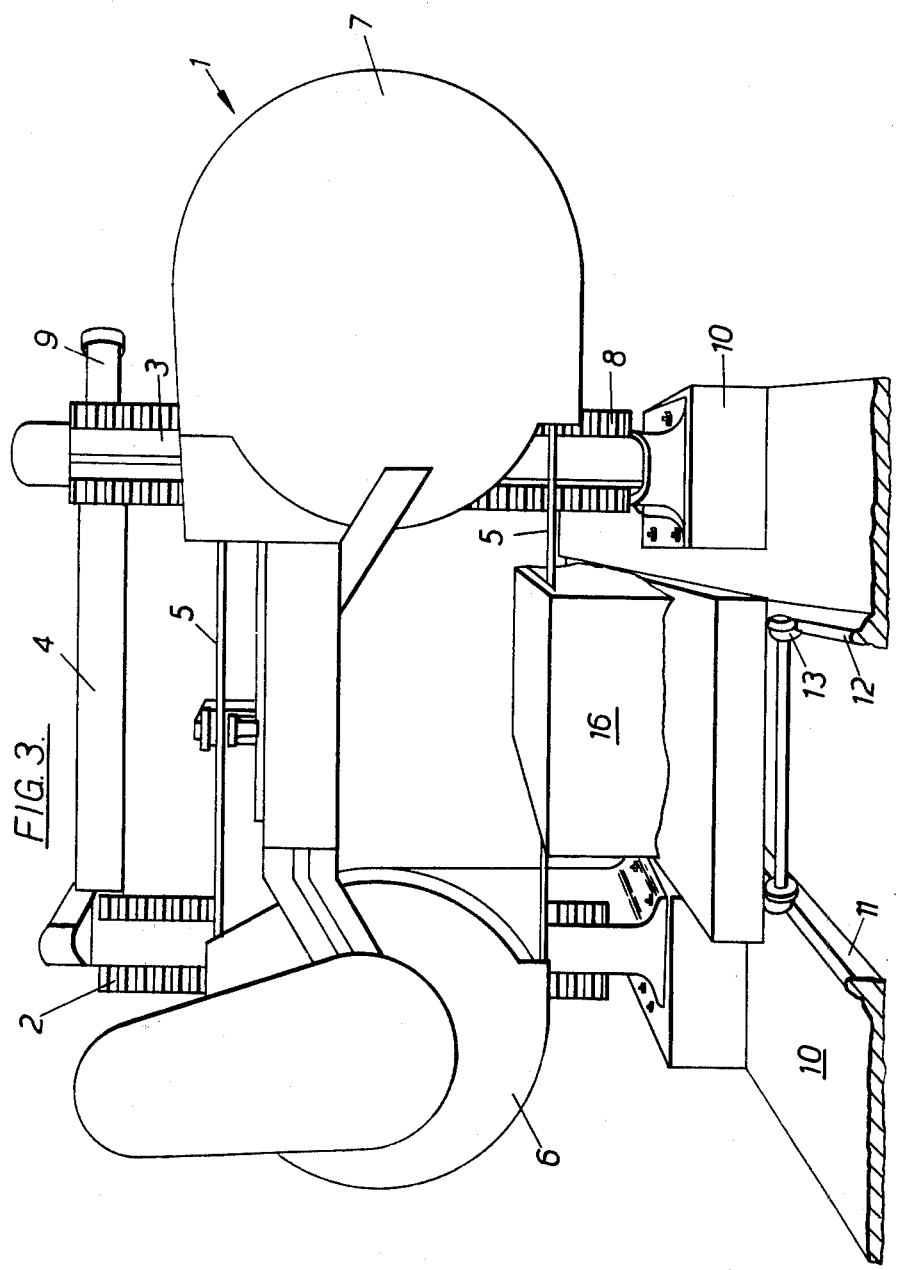

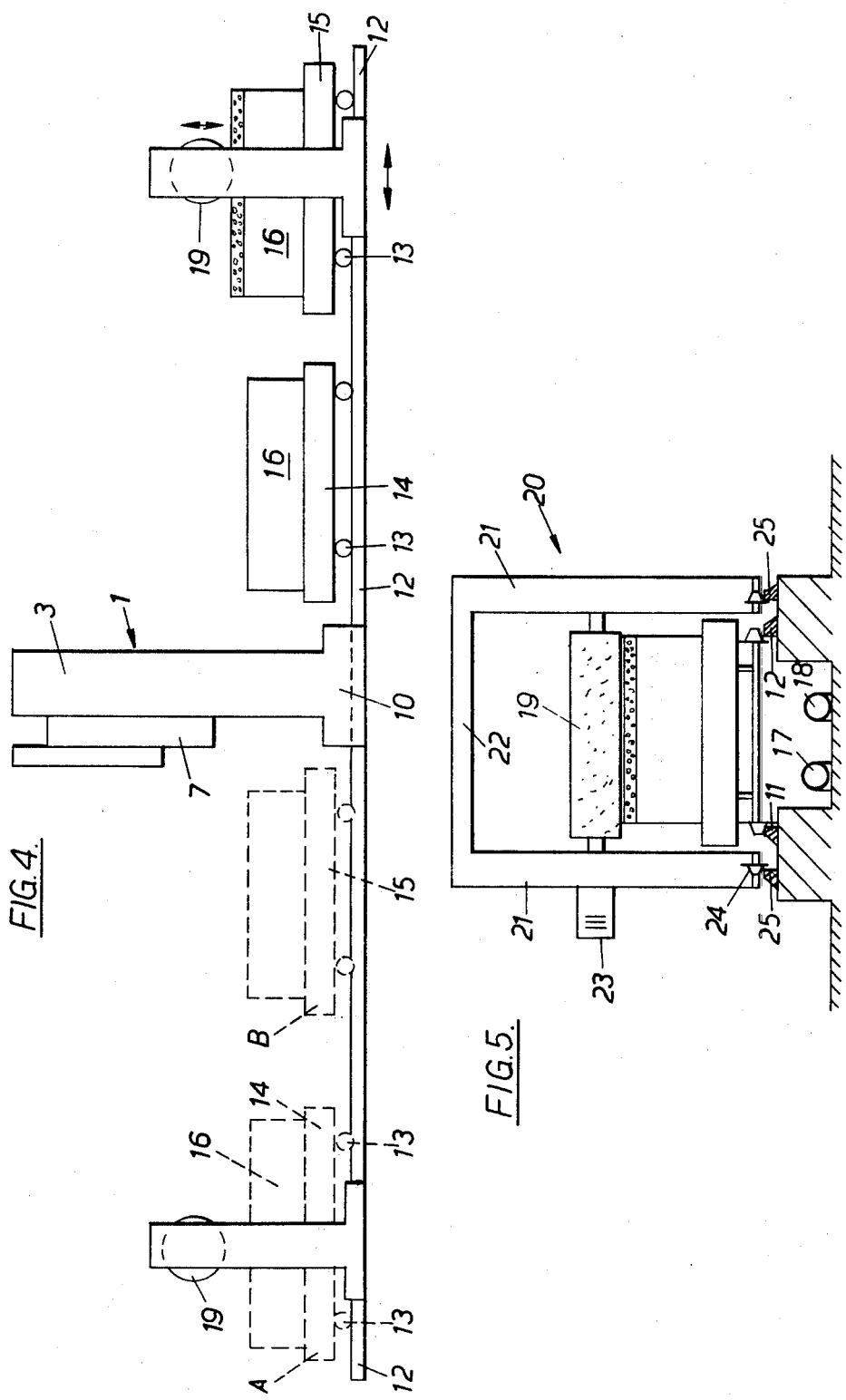

METHOD OF MAKING A COMPOSITE SURFACE ELEMENTS OF STONE AND LIGHTWEIGHT SHEET MATERIAL

BACKGROUND OF THE INVENTION

This invention concerns improvements in the manufacture and construction of composite surface elements, such as tiles and panels, having a natural stone facing and is a continuation-in-part of application Ser. No. 394,138, filed Sept. 4, 1973, now U.S. Pat. No. 3,963,846. Such elements are intended for use, for example, in the cladding of walls, ceilings or other surfaces, in the manufacture of furniture, and in fact for all purposes where natural stone surfaces are required.

Natural stone, such as marble, is an exquisite surfacing material on account of its hardness and durability, beauty of structure and high polish which can usually be imparted to it, but its use is greatly restricted by reason of its weight and expense, since the material is liable to fracture if not of a certain thickness, depending upon the handling and usage to which it may require to be subjected. These drawbacks are overcome by the invention the subject of my U.S. Pat. No. 3,723,233, which describes and claims a marble-faced composite wall panel comprising a marble lamina 2 to 5 millimeters in thickness and bonded by adhesive to a backing consisting of a sheet of metal honeycomb structure 1 to 2 centimeters thick having a glass fiber skin on the side of said honeycomb opposite said marble lamina about 0.5 millimeter thick, the cell walls of said honeycomb being perpendicular to the plane of the sheet. The present invention is an improvement in, and modification of, the aforesaid invention in that the multicellular metal core is replaced by a multicellular paper core which is considerably cheaper to produce than the metal core while having to the degree necessary for most practical purposes the required qualities of lightness and strength.

My aforesaid U.S. Pat. also claims a method of manufacturing a marble-faced composite surface element comprising a marble lamina bonded by adhesive to a backing comprising a metal sheet of honeycomb or cellular structure of substantially greater thickness than said lamina and having a skin of tenacious sheet material of substantially less thickness than said lamina bonded to the backing on the side thereof remote from said lamina, comprising the steps of adhesively bonding to the surface of a marble slab a metal sheet of honeycomb or cellular structure reinforced by a skin of tenacious sheet material bonded to the side of said sheet remote from said marble slab, and thereafter sawing off a portion of said marble slab to leave a thin marble layer adhered to said metal sheet. The marble lamina may be severed from the slab using a diamond-toothed bandsaw which cuts in a horizontal plane. However, conventional band-saws are designed to cut sheets of marble or stone of thickness much greater than 5 mm and they usually cut to an accuracy of about 1 to 2 mm. Such a margin of error is acceptable where the sheets being cut are relatively thick but it causes problems where the laminae are required to be cut to a thickness of between 2 and 5 mm. Any inaccuracy in cutting is usually reflected in the form of ridges or waves on the upper surface of the marble slab which causes problems in applying the backing. One way of overcoming this difficulty is to use an excess of adhesive which acts as a filler and makes up for any inaccuracies. However, this is an expensive procedure as a large amount of adhesive is required. Where the laminae are cut from a very thick block of marble the surface of the block must be thoroughly dry before applying the backing. Thus, the surface of the block of marble must be dried after each lamina is cut therefrom and this causes delays in manufacture. It is a further object of the present invention to overcome these problems.

SUMMARY OF THE INVENTION

According to the invention a composite surface element comprises a lamina of natural facing stone bonded by adhesive to a core or backing consisting of a sheet of lightweight multicellular resin-impregnated paper material having a skin of sheet material on the side of said core opposite said marble lamina, the cell walls of said multicellular core being perpendicular to the plane of the sheet. Preferably, the multicellular core is of kraft paper. The resin may be a thermosetting resin such as a phenolic, epoxide or polyester resin, and the core may contain up to 25% by weight of resin.

The multicellular paper core is commercially available in sheet form of various thickness, and is usually of honeycomb-like structure, the cell walls being perpendicular to the general plane of the sheet. Preferably, the cells are closed at least on one face by a skin which consists of a relatively thin sheet of tough material having good tensile qualities, such as resin-impregnated glass fiber or sheet aluminium, or tempered hardboard, which is firmly bonded to the core, and together they afford a firm support or backing which is firmly attached to the natural stone lamina by a suitable adhesive. The adhesive used for this purpose is preferably an epoxy resin, which becomes rock-hard on setting, if necessary under moderate heat treatment. A polyester resin may also be suitable for this purpose. If the core material is closed on one face only by a skin, the stone lamina is attached to the opposite face. Preferably, however, both faces of the core are closed by a skin of tenacious material to provide the requisite backing. If desired, a second lamina of natural stone may be bonded to the face of the backing remote from the first lamina.

The invention also includes an improved method of manufacturing a composite surface element which comprises bonding one surface of a backing comprising a multicellular resin-impregnated paper core to the surface of a slab of natural stone and thereafter severing a lamina from said slab with the backing adhering thereto. The core may be reinforced by a skin (as described above) of tough material having good tensile qualities, which skin may be bonded to the face of the core material remote from that to which the stone lamina is bonded. A skin of similar material may, if desired, be bonded to the opposite face of the core so that in the resultant element there is a skin of tenacious material interposed between the stone lamina and the core as well as a similar skin of tenacious material on the side remote from the stone lamina.

A similar procedure may be used to provide a panel faced on both sides with a stone lamina, the backing being bonded to a slab of stone, a lamina severed from the slab with the backing adhering thereto, the partly manufactured panel then being severed and its opposite side bonded to the slab and a second stone lamina severed therefrom. A diamond-toothed saw is preferably used to carry out the severing operation, and the stone surfaces of the panel may be polished in the normal way, as if the panel were of solid stone.

According to a further feature of the present invention a method of manufacturing a stone-faced composite surface element comprises applying and bonding a backing comprising a multicellular sheet material to the surface of a stone slab such that the backing follows any undulations in the surface of the slab, sanding the face of the multicellular sheet material which is remote from the face bonded to the slab until a substantially plane surface is obtained, and severing from the stone slab a lamina with the backing adhering thereto. In this way any inaccuracies on the surface of the stone are compensated for by the multicellular sheet material and any inaccuracies transmitted to the outer surface of the multicellular sheet material are removed in the sanding process. Any ridges or waves on the outer surface of the stone lamina may be removed during the usual grinding and polishing process. The stone lamina with the multicellular sheet material attached thereto is preferably cut from the stone slab after sanding of the sheet material but, if desired, the cutting step may precede the sanding step. The multicellular sheet material may be of metal, paper, or a plastics material, and should be flexible in the general plane of the sheet but resistant to compressive forces in a direction substantially normal to the surfaces of the sheet. If the multicellular sheet material is of metal having a honeycomb-like structure, as described in my U.S. Pat. No. 3,723,233, then it may be necessary to apply a resin or wax filler to the honeycomb before sanding as otherwise the sanding may cause burring of the outer edges of the walls of the honeycomb cells. The multicellular sheet material is preferably made of a resin-impregnated paper and, preferably, is of honeycomb-like structure with the walls of the honeycomb being arranged perpendicular to the general plane of the sheet. Suitable resins for impregnation of the paper are, for example, phenolic, epoxide and polyester resins. The resin facilitates the sanding process and prevents burring of the edges of the honeycomb. The multicellular paper sheet material may suitably contain up to 25% by weight of resin.

After sanding has taken place the multicellular sheet material is reinforced by a skin of tough material having good tensile qualities, which skin is bonded to the face of the multicellular material which is remote from that to which the stone lamina is bonded. The skin, which may suitably consist of a relatively thin sheet of a resin-impregnated glass fiber, sheet aluminium, or resin-impregnated hardboard, is firmly bonded to the multicellular material by a suitable adhesive.

The invention includes apparatus for carrying out the method described above, comprising a band-saw mounted between upright supports and having a blade adapted to cut in a substantially horizontal plane, means for raising and lowering the band-saw along the supports, at least one sanding roller rotatably mounted about a horizontal axis opposite to, but spaced from, the saw-blade, the axis of the sanding roller being movable in both a horizontal and vertical plane, and means for moving a block or a slab or stone between the upright supports to enable cutting of the stone to take place. Preferably, the means for moving the block of stone comprises at least one carriage movable along parallel rails which extend between the upright supports in a direction normal to the cutting edge of the saw-blade. The carriage may be moved along the rails by means of a hydraulic ram or the like.

In carrying out the method of the invention it is first desirable to dry the surface of the stone slab thoroughly. Adhesive is then sprayed on the dried surface and the sheet of multicellular material is applied. It is necessary to wait up to 40 minutes until the adhesive has set before sawing can take place. The sawing operation itself also normally requires about 40 minutes. The conventional band-saw is provided with only one block carriage and so when the stone block is being prepared for cutting the saw is idle and this results in a considerable time loss. I have found that one way of overcoming this problem is to extend the carriage rails so that they can accommodate two block carriages both to the front and to the rear of the saw. Thus when work commences two block carriages, each carrying a block, are positioned to one side of the saw. When the multicellular backing has been applied to the first block and the adhesive has dried the first block is passed through the saw. When the first block is being sawed the second block is prepared and is in turn passed through the saw. During the sawing of the second block the lamina and its attached backing is removed from the first block and another multicellular backing applied. When sawing of the second block is completed the saw is raised and the two blocks are then passed back under the saw and sawing of the second lamina from the first block commences while the second block is prepared for cutting again. In this way the saw is used intensively with little time loss.

Thus, according to yet a further feature of the invention, apparatus for use in the manufacture of a stone-faced composite element comprises a band-saw mounted between upright supports and having a blade adapted to cut in a substantially horizontal plane, means for raising and lowering the band-saw along the supports, and at least two carriages movable between the upright supports in a direction normal to the cutting edge of the saw-blade, each of which carriages is adapted to offer to the saw for cutting a block or slab of stone mounted on the carriage. Preferably, the carriages are movable along parallel rails which extend between the upright supports. The rails should be of sufficient length as to accommodate the two block carriages both to the front and to the rear of the band-saws. In a preferred embodiment a sanding roller is arrange both to the front and to the rear of the band-saw and is mounted for movement on a pair of rails arranged outside, but parallel to the carriage rails.

Where the stone lamina to be cut is not required to exceed much more than two feet (about 70 cm) in width then it may be severed from the stoneblock using a diamond-toothed circular saw arranged to cut in a vertical plane. The blocks of stone are mounted on their sides on the block carriages with the surfaces to be cut lying in a vertical plane. The carriages are then fed to the saw as described above. Using this procedure it is not essential to apply the multicellular backing to the block of stone before cutting as it has been found that if the severed lamina is kept standing in a substantially vertical plane resting on its edge it can be removed sideways from the slab by means of suction pads and then held on its edge while the backing is applied.

According to yet a further feature of the present invention, a method of manufacturing stone-faced composite surface elements comprises bonding a backing in the form of a lightweight multicellular sheet material to each of two opposite faces of a stone slab and thereafter severing the slab in two to leave a lamina of stone adhering to each backing.

DESCRIPTION OF THE DRAWINGS

The invention is hereinafter described with reference to the accompanying drawings, wherein:

FIG. 3 is a perspective view of a band-saw, stone block and block carriage;

FIG. 4 is a diagrammatic side view of one form of apparatus according to the invention;

FIG. 5 is an end elevation of part of the apparatus shown in FIG. 4;

DESCRIPTION OF THE PREFERRED EMBODIMENTS

Figure 1:
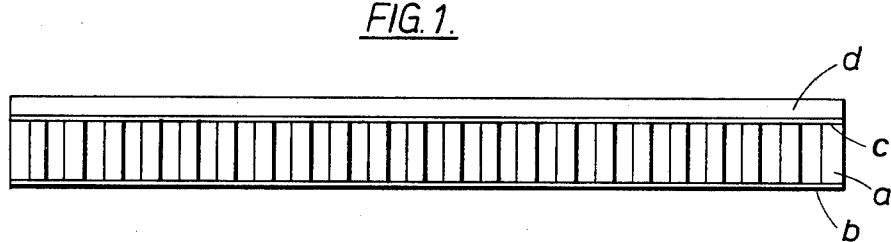
FIG. 1 is a side elevation of one example of a composite surface element according to the invention.
Figure 2:
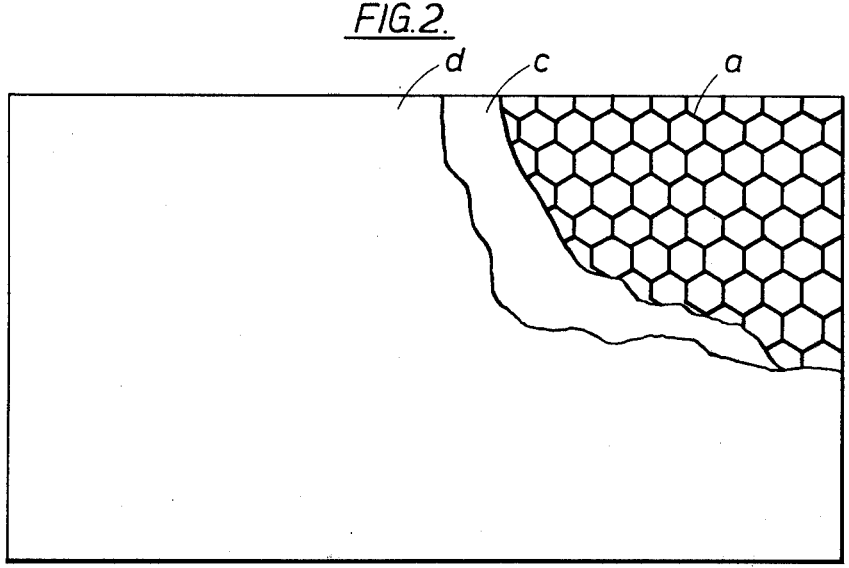
FIG. 2 is a plan view of the element of FIG. 1, with parts broken away.

In manufacturing the improved panel according to the invention, a core is first prepared, which in the example shown in FIGS. 1 and 2 comprises a honeycomb structure of phenolic resin-impregnated kraft paper produced in the form of a sheet a, advantageously about 12 mm in thickness, the cells open at each face and the cell walls extending perpendicularly to the general plane of the sheet. This material is commercially available. The paper core sheet a may be reinforced on each face with a thin sheet of resin-impregnated hardboard b,c, which is attached by a suitable adhesive, for example, an epoxy resin, or polyester resin. Preferably, however, the reinforcing skin b,c comprises a woven glass-fiber mat which is pre-impregnated with an epoxy resin which is not fully cured. The mat is then attached to the core, which has been rendered nonporous, and is cured in position.

The backing is secured by adhesive to the surface of a marble slab from which the lamina of marble is to be sawn off, after which the lamina d may be cut from the slab by the aid of a diamond-toothed band-saw or a circular saw, the lamina being from 2 to 5 mm in thickness. As the backing a, b, c supports the lamina d while the latter is being sawn from the crude slab, the risk of cracking the lamina is greatly reduced and remarkably thin marble laminae may be obtained.

It has been found that for the backing a core of a phenolic resinimpregnated paper honeycomb between 1 and 2 cms in overall thickness and having a resin-impregnated hardboard skin on both faces of the order of 0.5 mm thick, is adequate for most purposes, for example if tiles or panels for wall cladding are required. The skin or skins may, however, vary in thickness between 0.4 mm and 6 mm. The surface elements of the invention may, for example, be used to form partition walls in which case the paper core may be up to 15 cm in thickness or more and, if desired, the panel may be formed with a marble lamina on both faces by following out the method of manufacture referred to above.

One form of apparatus for carrying out the method of the invention is shown in FIGS. 3 to 5 of the drawings. The apparatus comprises a band-saw 1 mounted between two steel columns 2 and 3. The upper ends of the uprights are joined by a steel beam 4. The band-saw is commercially available and basically comprises a diamond-toothed endless saw-blade 5 which travels about two spaced-apart drums or rollers (not shown) rotatably mounted within casings 6 and 7, respectively. The saw-blade 5 and the drum may be raised or lowered along racks 8 provided on the face of the columns 2 and 3, by means of a motor 9. The columns 2 and 3 are bolted to a concrete foundation 10 which also serves to support two spaced apart parallel steel rails 11 and 12. The steel rails support the flanged wheels 13 of two carriages 14 and 15 each of which may carry a block of marble 16. The rails 11 and 12 are of sufficient length to accommodate at least two block carriages both to the front and to the rear of the band-saw 1. The carriages 14 and 15 are moved along the rails by means of hydraulic rams 17 and 18 respectively. Sanding rollers 19 are arranged both to the front and to the rear of the band-saw. Each sanding roller 19 is horizontally mounted in the frame 20 which comprises two steel upright members 21 joined by a steel beam 22. The sanding roller 19 is rotated by an electric motor 23. The frame 20 is mounted on wheels 24 which run along rails 25 arranged parallel to but outside the rails 11, 12. As shown in FIG. 4 the rails 25 are provided both to the front and to the rear of the band-saw 1, for a distance at least equal to the length of two block carriages. Each sanding roller 19 may be raised or lowered along the uprights 21 in well known manner and the frame 20 is sufficiently light in weight to be pushed manually along the rails 25.

In carrying out the method of the invention a block of marble is loaded on each of the block carriages, A and B. The carriages are each about 3 m. in length and about 1½ m. in width. The side of the marble blocks is preferably of the order of 1 m. in length by 65 mm in width by 1 m. in height, and they each weigh approximately 2½ tons. Block B is immediately passed through the saw and the rough back of the block is removed. This leaves a flat level surface on the top of the block. However, there may be some inaccuracy in cuttin, leaving waves or ridges on the surface of the block as explained above. The substantially plane surface of the block is thoroughly dried and a fine film of impact adhesive is sprayed to a thickness of about 2/1000 of an inch. A suitable adhesive is a molecular cross-linked neoprene. A sheet of resin-impregnated paper honeycomb material has previously been coated with a similar adhesive. This is applied to the surface of the marble and it follows any undulations on the surface of the marble. The sanding roller 19 is then passed over the outer surface of the honeycomb until a plane surface is obtained. The surface of the honeycomb is sprayed with an adhesive and a rigid skin, which itself has been pre-sprayed with adhesive, is applied to the surface of the honeycomb. The preferred skin is a sheet of oil-tempered hardboard of a thickness of ⅛ of an inch. However, if desired, a backing comprising a sheet of resin-impregnated glass-fiber may be applied in the wet state and allowed to dry. During the application of the backing on the block of carriage B, carriage A is passed through the band-saw to remove the rough back from the block carried by carriage A. The saw is the raised and the two block carriages are moved back under the saw to the left of the saw, as shown in FIG. 4. Carriage B is then passed forward again to remove a marble lamina from the surface of the block while a backing is applied to the block of carriage A in the manner described above. When carriage B is passed through the saw the lamina with the attached backing is removed and a further backing is applied to the surface of the block while the lamina is being cut from the block of carriage A. The process is then repeated.

If desired, instead of loading each carriage with one large marble block the carriage may be loaded with up to four blocks and the spacings between the blocks filled with a plaster filling.

Figure 6:
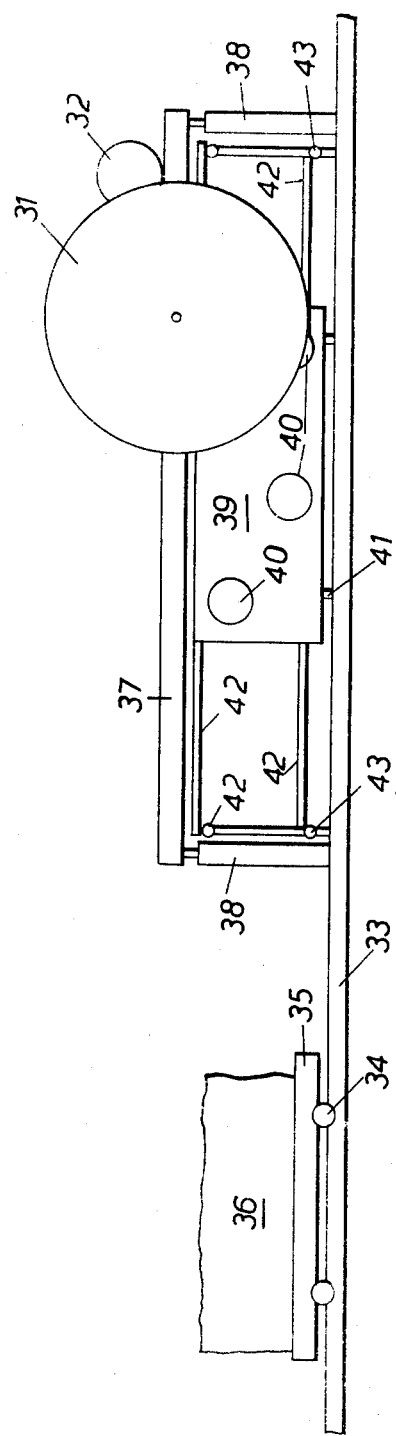
FIG. 6 is a diagrammatic side view of a second form of apparatus according to the invention.

The apparatus shown in FIG. 6, is suitable for cutting marble laminae of up to 2 feet (about 70 cm) in width. The apparatus comprises a diamond-toothed circular saw 31 vertically mounted alongside a pair of spaced apart parallel steel rails 33 which support the flanged wheels 34 of carriages 35. The carriages are adapted to carry blocks of marble 36, and are preferably five in number. The carriages may be moved along the rails by means of hydraulic rams or similar apparatus.

The circular-saw 31 is powered by an electrical motor 32 and the saw and motor are mounted on a cross-bar or gantry 37 which is arranged parallel to the rails 33. The saw and motor are movable lengthways along the gantry 37 to effect cutting. The gantry 37 is mounted on two concrete supports 38 which run in a direction normal to the rails 33. The gantry 37 is movable along the supports 38 so as to move the saw laterally away from and towards the rails 33.

In carrying out the method, rough-cut blocks 36 of marble or other stone are loaded on their edges on the carriages 35. The carriages are then moved passed the saw and the rough back of each block is removed to leave a flat level surface on the side of each block. A circular saw normally cuts very accurately so that there should be no waves or ridges on the surface of the block as might be obtained using a band-saw. However, if there are any inaccuracies of this kind a backing may be applied and sanded to obtain a plane surface in substantially the same manner as described above with reference to FIGS. 3 to 5, and the laminae and attached backings then removed by moving the carriages again passed the saw. Alternatively, the blocks are moved passed the saw without first applying a backing and the cut lamina are retained on their edge but resting against the block 36. An upright frame 39 is arranged behind the saw 31 and is provided with a number of suction pads 40. The frame is movable along grooves or rails 41 arranged at right angles to the carriage rails 33 such that the suction pads can be moved forward to grip the surface of the cut lamina. The frame with the lamina gripped by the suction pads is then moved backwards to remove the lamina laterally from the block 36. The backing can then be applied to the lamina, substantially as described with reference to FIGS. 1 and 2, while the lamina is held upright and supported by the suction pads.

The frame 39 is supported by means of rods 42 which rest on bars 43 arranged alongside the supports 38. The rods can be moved along the bars by hand and, if desired, can be turned to lay the lamina on a horizontal surface to facilitate bonding of the backing. The suction pads 40 may be connected to a vacuum pump by flexible piping. The depth of cut of the saw can be adjusted by raising or lowering the slab 36 by means of a hydraulic jack or the like.

The methods described above in relation to FIGS. 3 to 6 involve cutting successive marble laminae from relatively large and thick blocks of marble. The softer marbles tend to retain a considerable amount of moisture and so the surface of the marble block must be thoroughly dry before applying the adhesive by means of which the multicellular backing is applied to the block surface. In effect, this means that the cut surface of the block must be dried between each successive run through the saw and this causes delays and results in the saw being left idle for periods, which is uneconomical. In accordance with a preferred method of the invention, the marble block is first cut into a number of slabs which are of the order of 20 to 25 mm in thickness. The slabs are then left for a period in racks to dry either naturally or by means of force drying. When the slabs are dry a light weight multicellular backing is attached, in the manner described above, to each of the two opposite faces of the slab. The marble slab, with the backings attached, is then held firmly on its edge in an upright position by gripping means and is sawed in two by means of a circular saw. The saw cuts along a vertical plane which is parallel to, and midway between, the aforesaid opposite faces of the slab, to leave a lamina of marble attached to each backing. About 12 to 17 mm of the marble is lost in the cutting, depending upon the thickness of the saw blade, and so the resultant laminae are each about 4 mm in thickness and a further 1 mm of each lamina is lost in polishing and grinding so that the final composite surface elements each have a lamina of marble of about 3 mm in thickness. It will be appreciated that this method the marble slabs are all pre-dried and so there are no delays in the sawing process as the slabs can be passed successively through the saw without any halt being necessary for drying.

Figure 7:
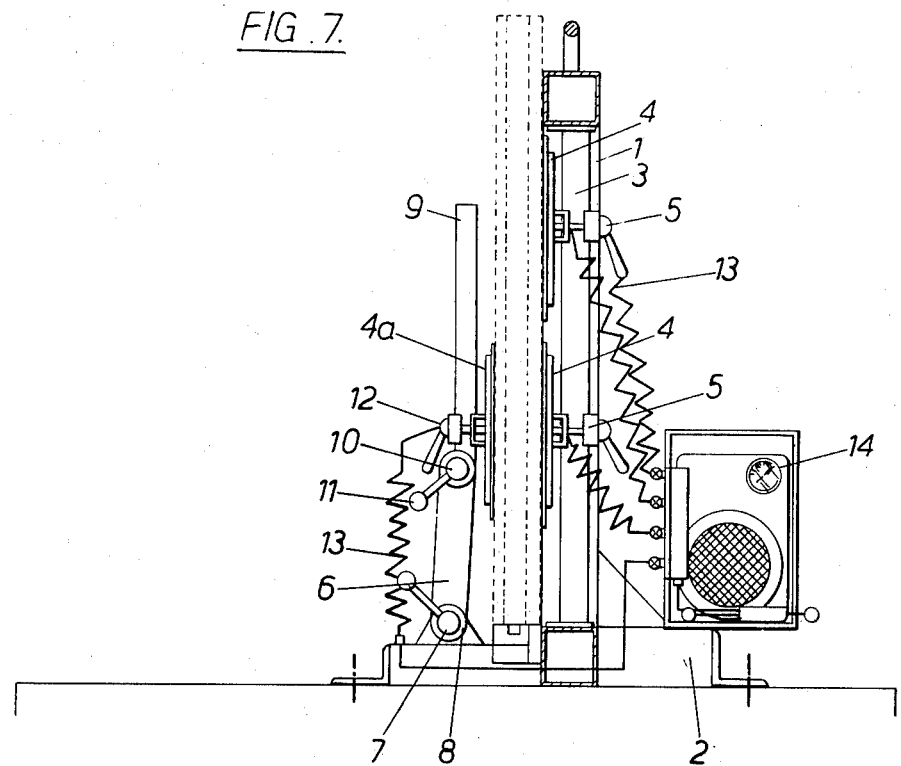
FIG. 7 is a side elevation of a third form of apparatus according to the invention.
Figure 8:
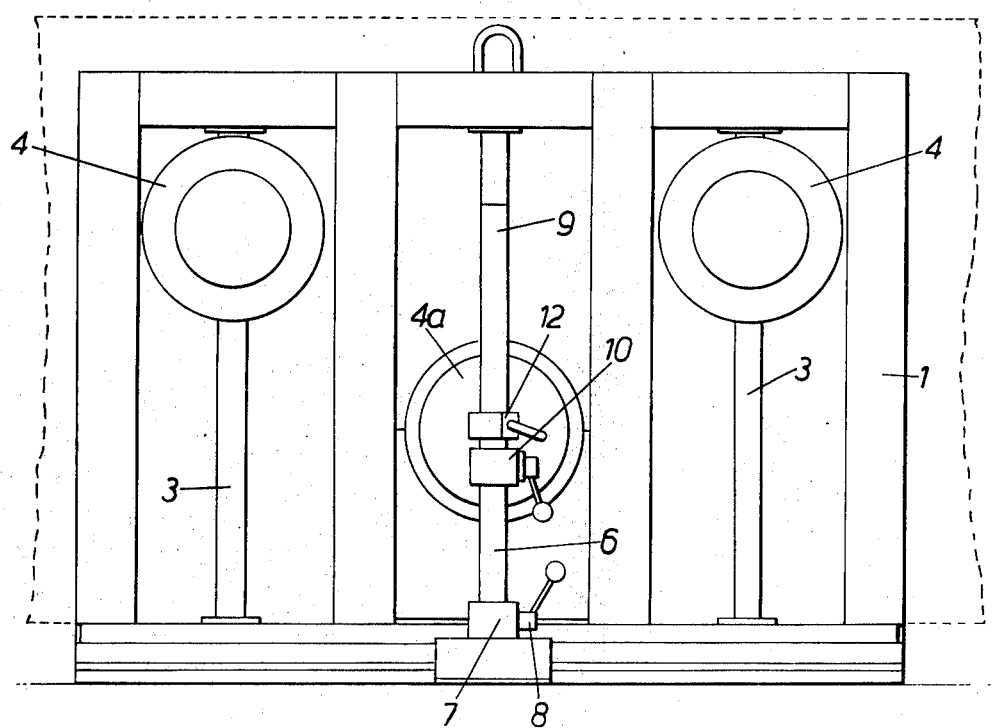
FIG. 8 is a front elevation of the apparatus shown in FIG. 7.

The gripping means of the invention is illustrated in FIGS. 7 and 8, and comprises an upright frame member 1 supported on a stand 2. The frame member 1 is provided with three tubular supports 3, which are arranged vertically in the frame member and are parallel to each other. A vacuum-operated suction cup 4 is mounted on each support 3 and is movable vertically along the support. A clamp member 5 is provided on each suction cup 4 to lock the suction cup in position at a desired location on the support 3. A tilting arm 6 is pivotally connected by a pivot 7 to the stand 2 at a position opposite to, but spaced from, the frame member 1. The tilting arm 6 is provided with a clamp member 8 which serves to lock the arm in a desired position. A tubular support 9 is hingedly connected to the end of the tilting arm 6 by means of a pivot 10. The pivot 10 is provided with a clamp member by means of which the tubular support 9 can be locked relative to the arm 6. A vacuum-operated suction cup 4a is mounted on the support 9 and is movable vertically along the support. The cup 4a can be locked in position at a desired location by means of a clamp member 12. The suction cups 4 and 4a are connected by suitable tubing 13 to a vacuum pump 14.

In operation of the device, a slab of marble which has been provided on opposite faces with a backing, as described above, is moved sideways between the frame member 1 and the tilting arm 6. The suction cups 4 are suitably positioned on the tubular support 3 having regard to the height of the slab. The clamps 8 and 9 are opened and the arm 6 and support 9 are tilted relative to each other until the suction cup 4a is parallel to and in contact with the outer surface of the element. The cup 4a is preferably positioned about midway up the element. The clamps 5, 8, 9 and 10 are then locked and suction is applied to cups 4 and 4a to hold the composite element rigidly in position. The circular saw is then moved into position and cuts the slab down the middle as described above. The clamps 8 may then be opened and the composite element which is left attached to the suction cup 4a can then be moved from the outer element which is supported by the suction cups 4.

It will be appreciated that a number of modifications may be made to the gripping device without departing from the scope of the invention. For example, the support arm 9 may be provided with two suction cups 4a which may be mounted on a horizontally extending arm so as to provide for horizontal adjustment of the cups. Furthermore, means may be provided for longitudinal adjustment of the tilting arm 6. Furthermore, the number of suction cups on the frame member 1 can be altered to suit the size of panels.

The methods and apparatus described above are particularly suitable for use in the manufacture of marble-faced composite surface elements. However, they may also be used in the manufacture of composite elements having other natural stone facings such as granite and onyx.

I claim:

1. A method of manufacturing composite surface elements each comprising a lamina of natural facing stone bonded by adhesive to a backing sheet consisting of a core of light-weight sheet material which is resistant to compressive forces in a direction substantially normal to the plane of the sheet, comprising the steps of:
   i. cutting a block of natural facing stone into a number of slabs, two opposite faces of which are substantially parallel and each of which has a thickness greater than twice the thickness of the desired lamina;
   ii. drying the cut slabs;
   iii. applying and bonding to each of the two opposed faces of each stone slab a backing sheet comprising a core of light-weight sheet material which is resistant to compressive forces in a direction substantially normal to the plane of the sheet;
   iv. positioning each slab, with the backing sheets attached to the opposite faces thereof, between oppositely arranged vacuum-operated suction caps;
   v. applying suction to the cups to hold the slab rigidly in position therebetween;
   vi. sawing the slab in two along a cutting plane substantially parallel to and midway between said faces to leave a thin stone layer adhered to each said backing sheet, and during said sawing step maintaining said suction to prevent relative movement of the partly-cut stone layers; and
   vii. before or after the sawing step bonding a skin of sheet material of greater tensile strength than the backing sheet to the surface of the core opposite the stone lamina.

* * * * *